(12) United States Patent
DeJohn, III et al.

(10) Patent No.: US 10,931,621 B2
(45) Date of Patent: Feb. 23, 2021

(54) METHODS AND SYSTEMS FOR PROVIDING LIFE EVENT NOTIFICATIONS TO ONE OR MORE USERS

(71) Applicant: Condolence Connect, LLC, Kirtland, OH (US)

(72) Inventors: Ross Charles DeJohn, III, Kirtland, OH (US); Paul Lienard Rupert, Kirtland, OH (US); Jonathan Lee Hoyt, Concord, OH (US); Harry Reid Sheppard, Kirtland, OH (US); Patrick Joseph Sullivan, University Heights, OH (US)

(73) Assignee: Condolence Connect, LLC, Kirtland, OH (US)

( * ) Notice: Subject to any disclaimer, the term of this patent is extended or adjusted under 35 U.S.C. 154(b) by 438 days.

(21) Appl. No.: 15/444,457

(22) Filed: Feb. 28, 2017

(65) Prior Publication Data
US 2018/0246971 A1    Aug. 30, 2018

(51) Int. Cl.
G06Q 50/00        (2012.01)
H04L 12/58        (2006.01)
G06Q 10/10        (2012.01)

(52) U.S. Cl.
CPC ............. *H04L 51/32* (2013.01); *G06Q 10/10* (2013.01); *G06Q 50/01* (2013.01); *H04L 51/24* (2013.01)

(58) Field of Classification Search
CPC ......... H04L 51/14; H04L 51/32; H04L 67/20; G06Q 50/01; G06Q 30/0277; G06Q 30/0631
See application file for complete search history.

(56) References Cited

U.S. PATENT DOCUMENTS

| | | | | |
|---|---|---|---|---|
| 8,565,810 | B1* | 10/2013 | Giles ................ | H04M 3/42382 455/550.1 |
| 8,949,250 | B1* | 2/2015 | Garg .................. | G06F 16/9024 707/748 |
| 2004/0225681 | A1* | 11/2004 | Chaney ............... | G06F 16/40 |
| 2009/0036148 | A1* | 2/2009 | Yach ................ | H04M 1/72566 455/457 |
| 2009/0150507 | A1* | 6/2009 | Davis ..................... | H04L 51/14 709/207 |
| 2012/0233161 | A1* | 9/2012 | Xu ...................... | G06F 16/9535 707/732 |
| 2013/0117692 | A1* | 5/2013 | Padmanabhan .... | H04N 21/4126 715/753 |

(Continued)

*Primary Examiner* — Yuk Ting Choi
(74) *Attorney, Agent, or Firm* — Cooper Legal Group, LLC

(57) ABSTRACT

One or more systems and/or methods for providing a notification of a life event to a user for a contact of the user are provided. A contact database (e.g., an electronic address book, a social media contact list, etc.) associated with the user may be evaluated to identify a contact from a set of contacts of the user. A contact query may be created for the contact. The contact query may be utilized to access data articles within a data store. The data articles may be evaluated to identify life events associated with the contact. In an example, the life event may be at least one of a death event, a birth event, an engagement event, a marriage event, a graduation event, an anniversary event, or the like. A notification may be provided to the user of the life event in response to identifying the life event for the contact.

20 Claims, 16 Drawing Sheets

(56) References Cited

U.S. PATENT DOCUMENTS

| | | | |
|---|---|---|---|
| 2014/0229552 A1* | 8/2014 | Ranganath | H04L 51/32 |
| | | | 709/206 |
| 2014/0335814 A1* | 11/2014 | Gudlavenkatasiva | H04W 4/90 |
| | | | 455/404.1 |
| 2014/0358882 A1* | 12/2014 | Diab | G06F 16/532 |
| | | | 707/707 |
| 2015/0249742 A1* | 9/2015 | Li | G06Q 30/016 |
| | | | 455/414.1 |
| 2016/0171556 A1* | 6/2016 | Grewe | G06Q 30/0269 |
| | | | 705/14.66 |

* cited by examiner

METHODS AND SYSTEMS FOR PROVIDING LIFE EVENT NOTIFICATIONS TO ONE OR MORE USERS

BACKGROUND

As modern technology (e.g., the internet, social media, mobile computing devices, etc.) continues to advance, the world seem to be getting smaller and smaller. To this end, long past are the days where an individual's friends and acquaintances (e.g., contacts) are primarily derived from people in a local community (e.g., an individual use to be likely to be friends with people that lived down the street, went to the same school, played on the same football team, worked for the same company, etc.). With the growth of the internet, social networks, and cloud computing, many individuals now have friends and/or acquaintances from a plurality of different channels/venues (e.g., individuals may have friends from chat rooms, social media networks, multiplayer gaming networks, dating websites, etc.). For example, individuals may have friends that they have never met in the physical word (e.g., individuals located thousands of miles apart may collaborate on a research project through a video conferencing service, etc.).

As a result of this ever-growing network of friends, many users struggle to stay up-to-date with respect to potentially important events taking place in the lives of said friends (e.g., it is not unusual for millennials to have several thousand friends/connections across a plurality of social media networks as well as many friends/acquaintances from local communities). In an attempt to stay up-to-date, many users may utilize search engines to perform search tasks on a regular basis and/or spend hours sifting through potentially irrelevant social media posts to attempt to address their information needs. For example, an individual may provide one or more search queries to a search engine in an attempt to determine new information for a contact (e.g., a friend or acquaintance associated with the individual). Unfortunately, performing said searches for information associated with contacts through a search engines often results in a great number of irrelevant results (e.g., often searches have limited accuracy as a result of how the individual performs said search). Responsive to a search returning a plurality of irrelevant results, individuals may abandon searches for events associated with their contacts. Additionally, individuals may fail to be aware of potentially relevant events for a contact as a result of the individual not regularly performing said search (e.g., responsive to the individual forgetting to perform a search for several days and/or not have sufficient free time to perform said search, the user may fail to be aware of a death of a contact).

SUMMARY

In accordance with the present disclosure, one or more systems and/or methods for providing a notification of a life event to a user for a contact (e.g., a personal contact, a work contact, a political contact, a sports contact, a social media contact, etc.) associated with the user are provided. In an example, the notification may be provided to the user on a mobile device (e.g., smart phone, tablet, smartwatch, augmented reality device, etc.) of the user. A contact database (e.g., an electronic address book, a social media contact list, etc.) associated with the user may be evaluated to identify a contact from a set of contacts of the user. A contact query may be created for the contact within the set of contacts. In an example, the contact query may comprise contact information (e.g., name, birthdate, home address, work address, family members, etc.) for the contact. The contact query may be utilized to access data articles within a data store. In an example, the data store may comprise data articles compiled from at least one of a website, an intranet, or a declarative source. The data articles may be evaluated to identify life events associated with the contact. In an example, the life event may be at least one of a death event, a birth event, an engagement event, a marriage event, a graduation event, an anniversary event, a new home event, a new job event, an award event (e.g., winning a championship game, winning a Noble Prize, winning a community service award, etc.). A notification (e.g., email notification, push notification, banner notification, etc.) may be provided to the user of the life event in response to identifying the life event for the contact. In an example, the notification may be provided to the user on a mobile device (e.g., smart phone, tablet, smartwatch, augmented reality device, etc.) of the user. The notification may comprise at least one of a summary element, a service element, a messaging element, a pre-recorded message element, a memory element, and/or the like.

In an example, the contact database may comprise an electronic address book, a social network contact list (e.g., a friends list, a networking list, etc.), an email contact list, an application profile, or a message board contact list. In another example, a first contact database may be combined with a second contact database to generate a unified contact database associated with the user. In an example, contact information for a contact may be compared with features for an individual associated with a data article to determine a contact relationship probability. Responsive to the contact relationship probability exceeding a contact probability threshold, the contact may be determined to corresponding the individual and the life event.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware, or any combination thereof.

1. Computing Scenario

The following provides a discussion of some types of computing scenarios in which the disclosed subject matter may be utilized and/or implemented.

1.1. Networking

Figure 1:
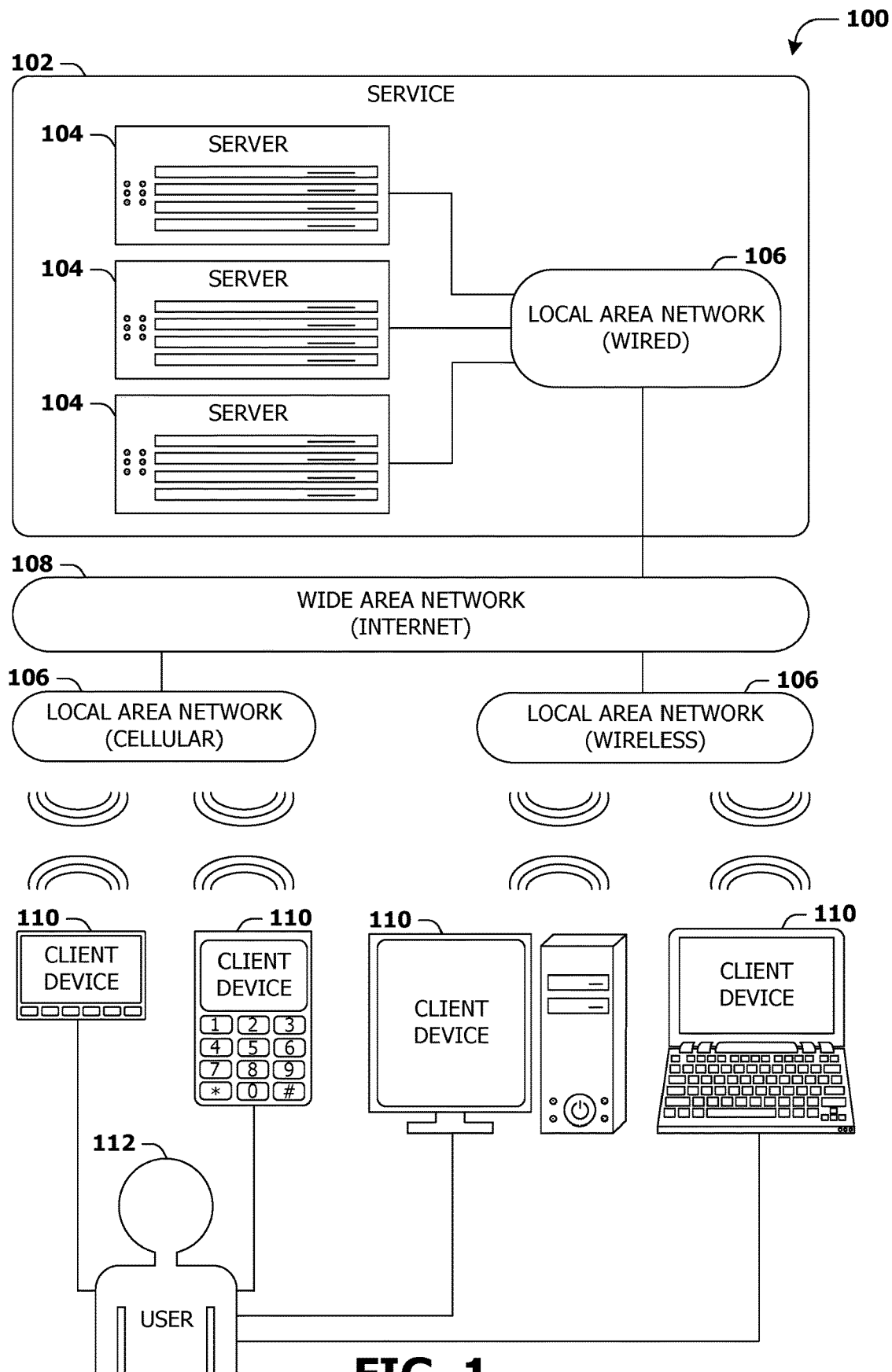
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fibre Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols, and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi network or a Bluetooth personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
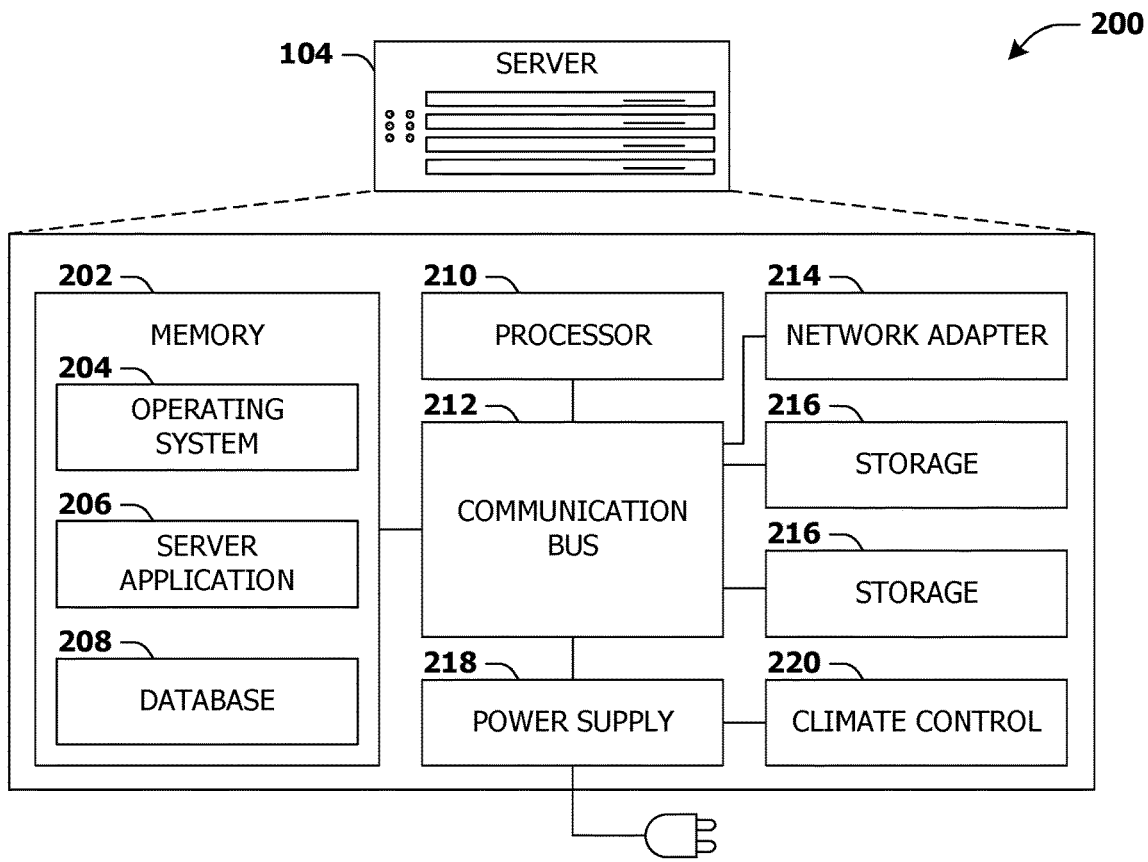
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
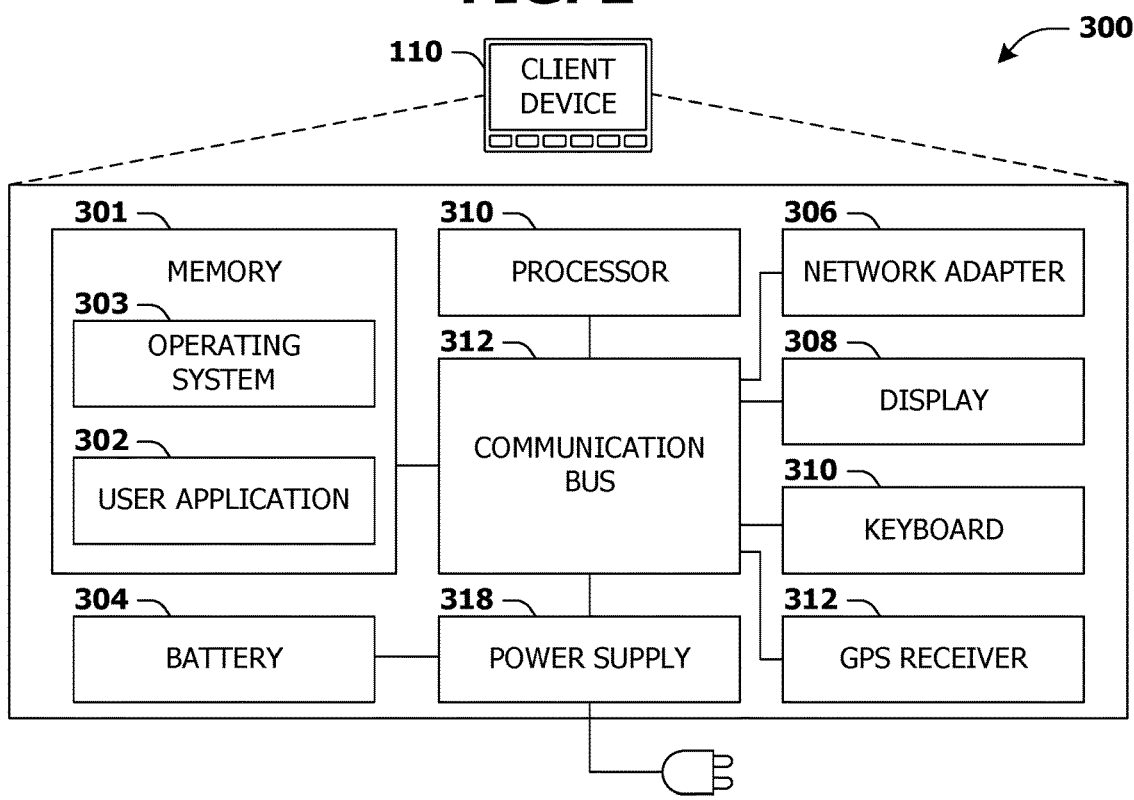
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more systems and/or techniques for providing a notification of a life event for a contact to a user are provided. Many search engines and/or search techniques may lack a capability to identify life events associated with contacts of users and/or lack an efficient means of notifying users of said life events. For example, many search engines may return a plurality of irrelevant life events associated with individuals other than a user's contacts and/or fail to notify the user of properly identified life events of contacts in a timely fashion. As provided herein, a contact database associated with the user may be evaluated to identify a contact from a set of contacts (e.g., a unified database and/or a mobile address book containing contact information for contacts of the user). A contact query may be created for the contact from the set of contacts. In an example, the contact query may be created from the contact information for the contact. The contact query may be utilized to access data articles associated with a data store to identify a life event of the contact. In an example, data articles contained within webpages may be evaluated to identify features for individuals and feature for life events within the data articles. The features for the individual and the features for the life event may be evaluated to determine the life event corresponds to the individual. The feature for the individual may be compared to the contact information for the contact. Responsive to the contact information corresponding to the features for the individual, the individual may be determined to correspond to the contact and the life event may be determined to corresponding to the contact. Responsive to identifying the life event of the contact, providing a notification of the life event to the user. The life event may comprise a service element associated with the life event (e.g., a flower delivery service may be presented to the user in response to a death event being identified for the contact).

By providing notification of life events for contacts of a user, a user's experience may be improved because relevant life events, which may otherwise not have been seen by the user, may be provided by the notification (e.g., the notification may increase the likelihood of uncovering otherwise hard to find life events that may have otherwise gone unseen and thus may increase the efficiency with which a user maintains up to date on life events for his contacts). Additionally, by utilizing the notifications, a user experience may be improved because irrelevant content, which the user may have otherwise had to view, may not be provide to the user. For example, by providing users with relevant notification of life events, users are less likely to inefficiently search for content related to important life events, which may in turn mitigate wasted computing resources and time otherwise spent attempting to locate relevant content (e.g., reduce search engine usage traffic that results from additional searches being performed, etc.). Additionally, by providing notifications containing service elements corresponding to service associated with the identified life event, users may be able to for efficiently respond to life events that have happened to contacts (e.g., wedding registry services may be provided to a user in response to a wedding life event for a contract; etc.) In this way, users may be able to efficiently identify services needed and reduce the computing resources needed to access said services (e.g., by providing access to those services in a single platform, the speed of accessing those service as well as the computing power needed to access them may be reduced). Accordingly, computing resources may be reduced, user efficiency for identifying life events for contacts may be improved, and a user satisfaction may be improved.

Figure 4:
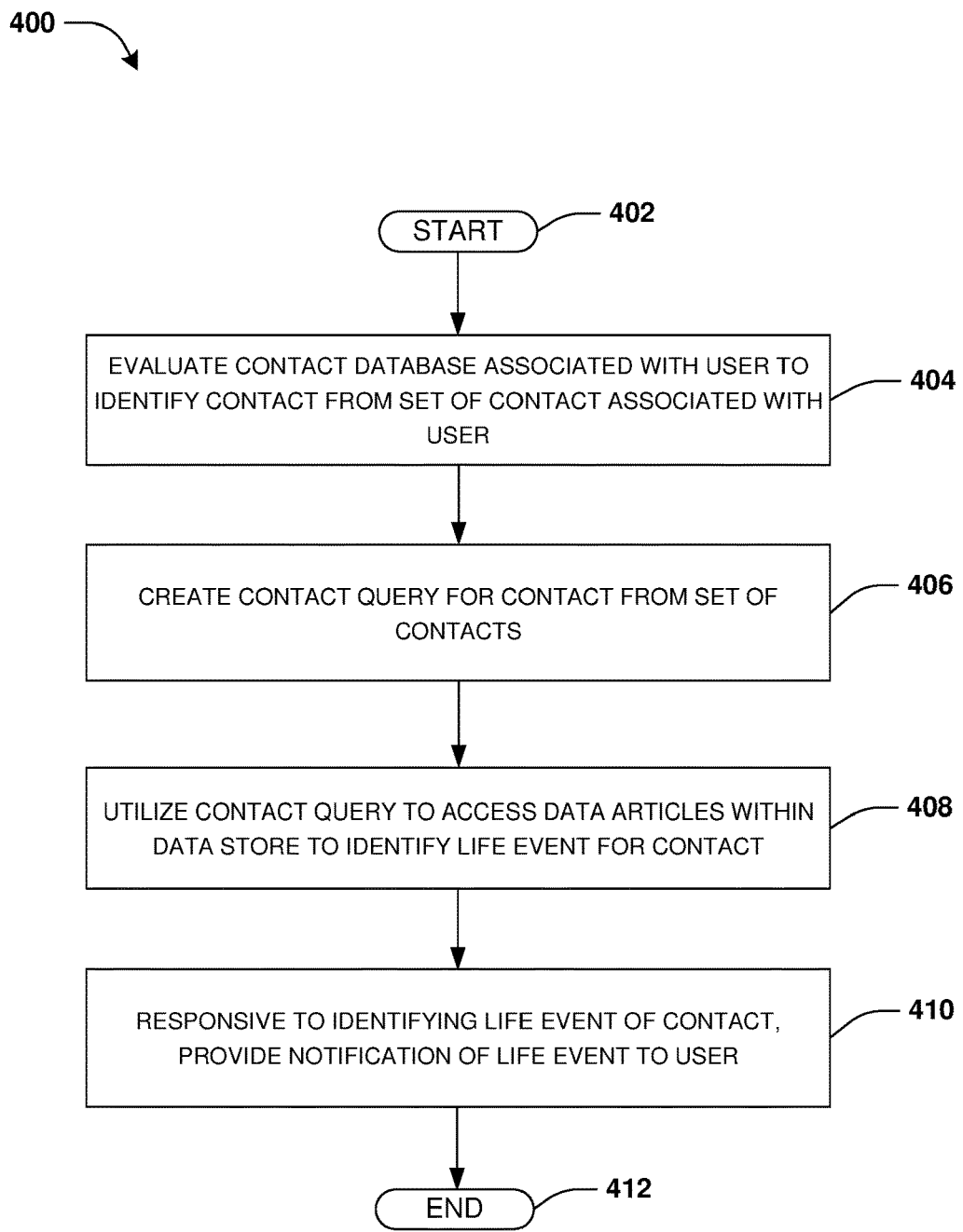
FIG. 4 is a flow chart illustrating an example method for providing a life event notification.

An embodiment of providing a notification of a life event to a user is illustrated by an example method 400 of FIG. 4. At 402, the method 400 starts. At 404, a contact database associated with a user may be evaluated to identify a contact associated with the user from a set of contact within the contact database. The contact database may comprise at least one of an electronic address book, a social medial contact list, an email contact list, a user supplied application profile contact list (e.g., a list of contacts that the user specifies in a user profile), a message board contact list, or an employee contact list for a company associated with the user. The contract database may be stored on at least one of a mobile device, a cloud server, a remote server (e.g., a server associated with a mobile application running on a mobile device, etc.), or a personal computer. In an example, the contact database may be stored on a mobile device of the user (e.g., a smartphone, a tablet, a smartwatch, etc.).

The contact database may comprise contact information for the contacts within the set of contacts (e.g., name of the contact, nickname of the contact, addresses associated with the contact, employers of the contact, birthdate for the contact, family members of the contact, etc.). The contacts associated with the contact database may comprise local contacts (e.g., contacts added to an electronic address book on the mobile device), unified contacts (e.g., contacts synced from a plurality of sources, such as social media accounts, cloud based address books, email contact lists, etc.), and/or interest based contacts (e.g., an actor identified by evaluating recent search history results, an athlete identified from the user following them on a microblog, a political figure identified from the user "liking" them on a social media website, etc.). In another example, the contact database may comprise unified contacts from a combination of an electronic address book, a social medial contact list, an email contact list, a user supplied application profile contact list, a message board contact list, or an employee contact list for a company associated with the user. For example, a first contact from a mobile phone address book and a second contact from a social media contact list may be combined generate the contact database (e.g., a global contact database).

In an example, the contacts within the set of contact may be prioritized based upon prioritization data (e.g., time since the user last called the contact, number of times the user called the contact in a given time, number of social media posts of the contact the user has liked, number of mutual contacts the user has with the contact, etc.) associated with the user. For example, the first contact may be prioritized above the second contact responsive to the prioritization data being indicative of the user calling the first contact more often than the second contact.

At 406, a contact query may be created for the contact from the set of contacts. The contact query may comprise the contact information associated with the contact from the contact database. In an example, the contact query may comprise at least one of a name of the contact, a home address, a business address, a birthdate, a spouse, a child, a sibling, a previous address, an employer, a job title, a digital image, a birth place, or an organization associated with the contact (e.g., a charity organization where the contact is known to volunteer, a club of which the contact is a member, etc.). The contact query may comprise a query request having search request parameters (e.g., databases to search, expansion policies, expansion protocols for meta tags, wildcard expressions, relevance scoring parameters, device identification information, search timeframe parameters, etc.). The search request parameters may be utilized to expand the contact query to generate an expanded contact query. In an example, the expanded contact query may comprise nicknames for the contact, alternate spellings for information associated with the contact, facial recognition data for the contact, or other information extrapolated from the contact database (e.g., information identified from evaluating social media sources, emails, text messages, or the like).

A set of contact queries may be generated for the contacts within the set of contacts. In an example, contact queries may be created for all of the contacts within the contact database. In another example, contact queries may be created for only particular contacts within the contact database (e.g., the user may indicate a set of particular contact to stay informed about, such as through a user profile; recent communications associated with a user, such as texts, emails, calls, etc., may be evaluated to identify current connections with particular contacts and contact queries may be created for said particular contacts; etc.). For example, the set of contact query may be created for particular contacts based upon the user identifying the particular contacts (e.g., the user may create an important contact list within a user interface of the mobile application). In another example, the contact query may be created for the first contact, but not the second contact, based upon the prioritization data for the first contact being greater than the prioritization data for the second contact (e.g., responsive to the user calling the first contact more than the second contact, the contact query may be created for the first contact).

In an example, the contact database may be located on and/or assessed by a first platform. The first platform may comprise hardware associated with a mobile device, an operating system running on the mobile device, and/or an application (e.g., a mobile application, a cloud based application, a web browser based application, etc.). In an example, the first platform may be associated with the mobile device of the user (e.g., the first platform may be hosted by a smartphone).

At 408, the contact query may be utilized to access data articles within a data store to identify a life event (e.g., a death event, a birth event, a marriage event, etc.) for the contact. The life event may comprise a birth event, a death event, a marriage event, a graduation event, a prom event, a sporting event, a political event, a religious event (e.g., christening event, first communion event, a bar mitzvah event, etc.), an anniversary event, a retirement event, or an engagement event.

In an example, the data store may be located on and/or assessed through a second platform, such as a cloud based platform. Responsive to the contact query being provided to the data store, such as in response to a query request, the contact query may be utilized to access the data articles within the data store. In an example, the contact query may be provided to the data store in real time or near real time in response to a user action (e.g., launching a mobile application) and/or automatically based upon a schedule (e.g., first thing every morning, once in the morning and once at night, every 15 minutes through the day, every weekday at 12:00 pm, etc.). In an example, a calendar of the user may be evaluated to determine the schedule (e.g., responsive to determining that the user has free time from 1 pm to 2 pm on Tuesday based upon an evaluation of the user's calendar, the contact query may be sent to the data store during the free time for the user). In another example, a location of the mobile device associated with the user may be utilized to determine the schedule. For example, the contact query may be sent to the data store in response to the user arriving at work, home, a location associated with a contact, or the like (e.g., a geofence may be established around particular locations and responsive to the user's mobile device being detected within said location(s), the contact query may be sent to the data store). In an example, valuable computing resources, energy, and data allocations may conserved by utilizing a schedule to determine when to assess the data store.

The data store may comprise a repository for storing and managing collections of data articles. In an example, the data store may comprise at least one of a relational database, an object oriented database, a key value database, a distributed data store (e.g., open source data store, a bigtable data store, etc.), a directory services data store, or a virtual machine data store. The data articles may comprise at least one of text files (e.g., news articles, emails, social media posts, etc.), image files (e.g., pictures from a new article, pictures from an image based social media feed, etc.), video files, or audio files. In an example, the data articles may be obtained from data sources accessible via at least on of an internet (e.g., the World Wide Web), an intranet, or a remote host server. The data sources may comprise webpages, such as a county auditor web page, a local newspaper obituary webpage, a community blog webpage, a federal licensing webpage, a federal birth registry webpage, an ancestry webpage, a social media webpage for the contact, or the like. The data articles within the data store may be associated with a life event and/or an individual. In an example, data articles that are not associated with both individuals (e.g., a potential unconfirmed contact) and life events may not be included in the data store.

In an example, the data articles may be evaluated to identify features associated with the data articles. The features may be identified by utilizing textual, contextual (e.g., sentence structure analysis, linguistical analysis, linear discriminant analysis, etc.), audio, location, source, and/or image recognition and processing techniques (e.g., the text of a newspaper article may be evaluated utilizing textual and contextual recognition processes to determine that a first individual named in the newspaper article passed away). In an example, the features may be evaluated to identify the life event and/or the individual associated with the data article (e.g., a name feature associated with a first individual and a subject matter feature corresponding to an engagement announcement may be evaluated to determine that the data article is directed to the first individual and an engagement life event; a voice recognition feature and a subject matter feature associated with a podcast data article may be evaluated to identify a second individual based upon the voice recognition feature and an election life event based upon the subject matter of the podcast corresponding to an interview with the second individual about being elected mayor; etc.). The features may comprise name features, location features, subject matter features, image features, date features, event features, third party features (e.g., a third party referenced in news article, such as a wife of a deceased contact, a business partner of an award recipient contact, etc.), sound features, weather features, medical/health features (e.g., risk features), and/or other identification features of individuals and/or life events associated with the data article (e.g., a phone number associated with an individual, a social security number associated with an individual, an email address associated with an individual, a social media user name associated with an individual, a finger print associated with an individual, a voice pattern associated with an individual, etc.). By way of example, the individual may be identified based upon a name feature, a third party feature, and/or a facial recognition feature (e.g., if a data article is discussing "Jon Doe", "Jon Doe" may be identified as the individual; if a second data article is associated with an unnamed person but discusses children of the unnamed person, a third party children feature may be utilized to establish a link to the individual, which can be later utilized to identify the individual based upon contact information; etc.). In yet another example, contextual features from a data article may be evaluated to determine if the life event is associated with the individual (e.g., contextual features may be utilized to determine if a death event is associated with a first individual named in the data article and/or a second individual named in the data article).

In an example of assessing the data articles, the contact information for the contact associated with the contact query may be compared to the feature of the data article corresponding to the individual to identify a contact relationship between the contact and the individual (e.g., the contact and the individual may be determined to be the same person). More specifically, an aspect of the contact information (e.g., the name of the contact) for the contact may be compared to the feature, such as the name feature, of the individual to determine a contact relationship probability (e.g., a contact name corresponding to "Jon Smithers" may be compared to a name feature corresponding to "Jonathan Smithers" to determine a contact relationship probability). Responsive to the contact relationship probability exceeding a relationship probability threshold (e.g., 70% likelihood that the contact and the individual are the same person), the life event associated with the individual may be determined to correspond to the contact.

In an example, a first contact associated with first contact information and a first individual associated with a first feature may be determine to have a first contact relationship probability. In another example, a second contact associated with second contact information and the first individual associated with the first feature may be determined to have a second contact relationship probability. Responsive to the first contact relationship probability but not the second contact relationship probability exceeding the contact relationship probability threshold, the first contact but not the second contact may be identified as corresponding to the first individual. Responsive to determining that the first contact corresponds to the first individual, the life event may be determined to correspond to the contact. In some example, a plurality of contact information and features may be evaluated to determine an average contact relationship probability.

In an example, a feature component may provide feature weights for the features of the digital article. The feature weights may be utilized to determine the contact relationship probability. The feature weights may be determined based upon weighting parameters learned from training data. The feature weights may be indicative of an importance of a particular feature (e.g., the more important the feature is to determining an identity of an individual and/or the life event, the greater the feature weight may be for that feature). For example, responsive to a first feature having a larger feature weight than a second feature, the first feature may have a greater impact on the contact relationship probability (e.g., a name feature may have a greater feature weight than a location feature).

In an example, a current location of the user may be utilized to determine the contact relationship probability. For example, responsive to the current location of the user corresponding to a location feature of the life event or a location feature of the individual, the relationship probability for the data article may be increased (e.g. if the user is in the same town as the individual who shares the same name as the contact, the relationship probability may be increased beyond what it would be if the contact and the individual just shared the same name).

At 410, responsive to identifying the life event for the contact, a notification of the life event may be provided to the user. The notification may comprise at least one of a push notification, an email notification, a text notification, a virtual reality notification, or an augmented reality notification. In an example, the second platform may send the notification to the first platform and/or the mobile device of the user. The notification may be displayed within a user interface associated with the mobile device of the user.

In an example, the notification may comprise a summary element (e.g., a summary of the life event), a messaging element, a related contact notification element, and/or a services element. The summary element may contain text from the data article. In an example, the summary element may be generated based upon features identified within the data article (e.g., an image of contact, a shortened version of relevant text from the data article, a link to a webpage associated with the life event, etc.). The messaging element may be utilized by the user to send a message to the contact and/or an organization acting on behalf of the contact. In an example, the message may comprise a text message, a voice message, a social media message, an augmented reality message, a virtual reality message, an email message, a message board message, and/or a condolence message. In an example, the user may compose, edit and send the message from the user interface (e.g., the messaged may be composed within the same mobile application associated with the notification). The related contact notification element may be utilized to message a second contact about the life event. In an example, responsive to the user selecting the related contact notification element, a list of other contacts associated with the contact may be displayed to the user (e.g., if the contact associated with the life event is an employee of a cleaning company, the list of other contact may be populated with other contacts that are also employees of the cleaning company). Responsive to the user selecting a second contact from the list of other contacts, a notification may be sent to the second contact regarding the life event for the contact.

In an example, the service element may offer services associated with the life event. For example, responsive to the life event comprising a death event, the service element may correspond to a follower service, a card service, a food service, a charity service, or the like. In another example, responsive to the life event comprising a marriage event, the service element may correspond to a wedding registry service which may be utilized to purchase a wedding present for the contact. In an example, the contact information for the contact may be utilized to populate informational fields associated with the service (e.g., the contact's shipping address, telephone number, etc.).

In an example, responsive to identifying the death event for the contact, a pre-recorded message database may be assessed to identify a pre-recorded message associated with the contact. Responsive to identifying the pre-recorded message, the pre-recorded message may be displayed to the user.

In an example, a set of notification associated with a plurality of life events for a plurality of contacts may be displayed to the user through the user interface. The notifications within the set of notifications may be ranked based upon a relevance to the user. For example, a first life event associated with a family member contact may be ranked higher than a second life event associated with a social media contact based upon the user indicating family member contacts to be more relevant than social media contacts. In yet another example, a third life event having a greater contact relationship probability may be ranked higher than a forth life event having a smaller contact relationship probability (e.g., the life event with the greater relationship probability is more likely to be correctly associated with the contact of the user). The notifications within the set of notification may be displayed to the user based upon rankings (e.g., higher ranked notifications may be displayed to the user before the lower ranked notifications). In this way, the user may be efficiently provided with the most relevant notifications.

In an example, the notification may comprise commenting capabilities. The commenting capabilities may comprise a link to a message board (e.g., a message board associated with a third party website, a message board associated with a third party mobile application on the users mobile device, a local message board native to the associated mobile application, etc.). In an example, the message board may be a message board associated with a funeral home website. The message board may comprise an electronic condolence book for a funeral service, a calling hours service, a wake, or the like.

By utilizing notifications for life events associated with contacts of a user, an overall user search, notification, and response (e.g., ordering services, sending secondary notification, etc.) experience may be improved because the notifications may comprise relevant content associated with known contacts that otherwise may not have been identified. The user search experience will also be improved as the user will have less irrelevant content to sort through as a result of the notification being based upon a probability threshold that prescreens potential data articles (e.g., content). At 412, the method 400 ends.

Figure 5A:
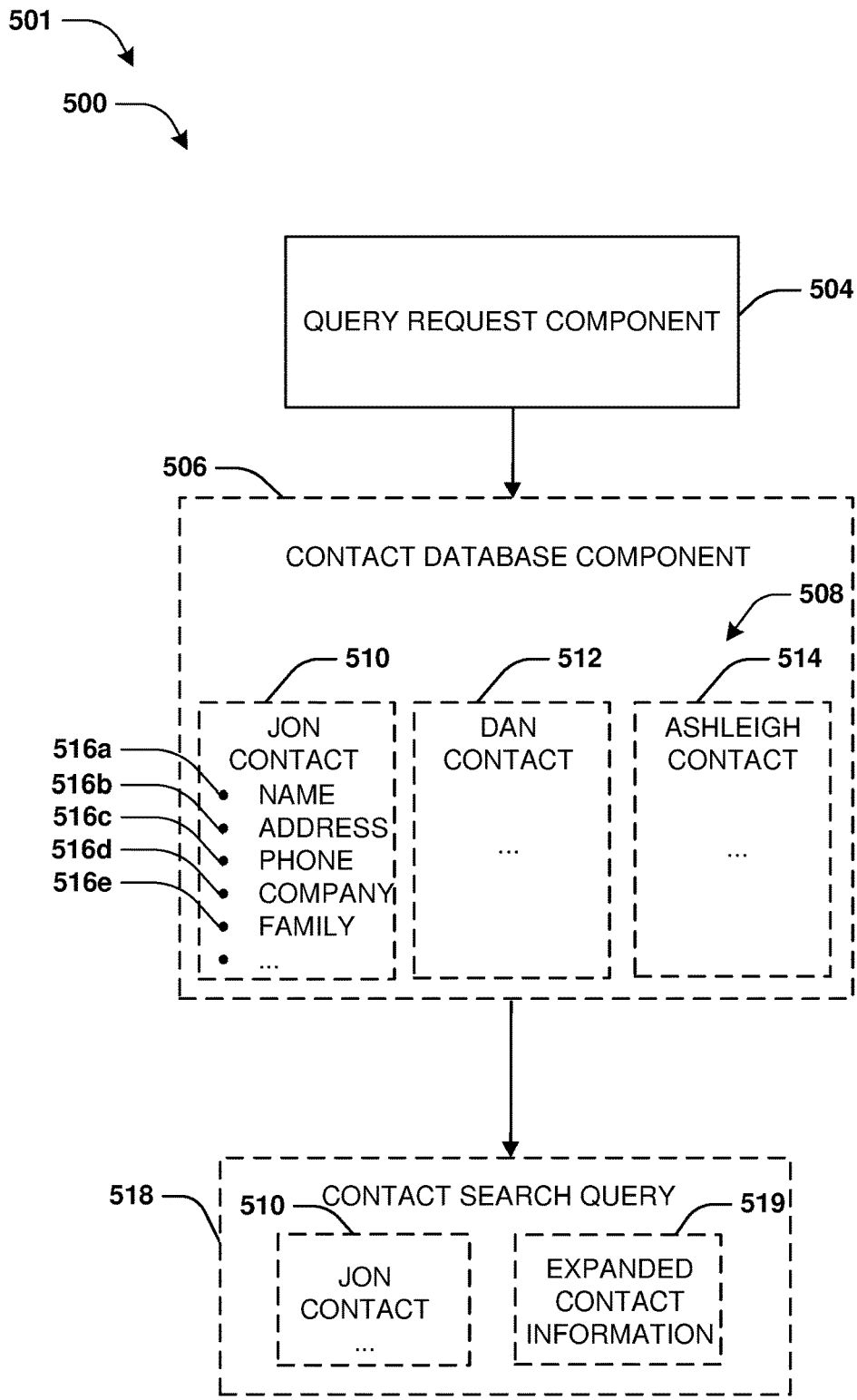
FIG. 5A is a component block diagram illustrating an example system for providing a life event notification, wherein a contact database is evaluated to generate a contact search query.

FIGS. 5A-5F illustrate examples of a system 500 wherein a notification 532 of a marriage life event 525 is provided to a user through a mobile device 534. FIG. 5A illustrates an example 501 of the system 500 where a query request component 504 is configured to generate a contact query 518. The query request component 504 may assess a contact database 506 to identify contacts, such as a first contact 510, a second contact 512, and a third contact 514. Responsive to the query request component 504 identifying the contacts 510-512, the query request component 504 may evaluate the contacts 510-514 to identify contact information, such as name information 516a, address information 516b, phone information 516c, company information 516d, family member information 516e, or the like (e.g., relationship status information, anniversary information, etc.).

The query request component 504 may evaluate the contact information 516a-516e to generate a contact search query 518 for the first contact 510. In an example, the query request component 504 may evaluate the contact information 516a-516e to generate expanded contact information 519. The expanded contact information 519 may be generated by reformulating the contact information 516a-516e to improve a retrieval performance associated with the contact search query 518. By way of example, the contact information 516a-516e may be expanded by identifying synonyms, finding morphological forms of words, fixing spelling errors, and assigning weights to each aspect of the contact information 516a-516e. In this way, the contact search query 518 may be more rich and robust and therein more likely to identify the marriage life event 525.

Figure 5B:
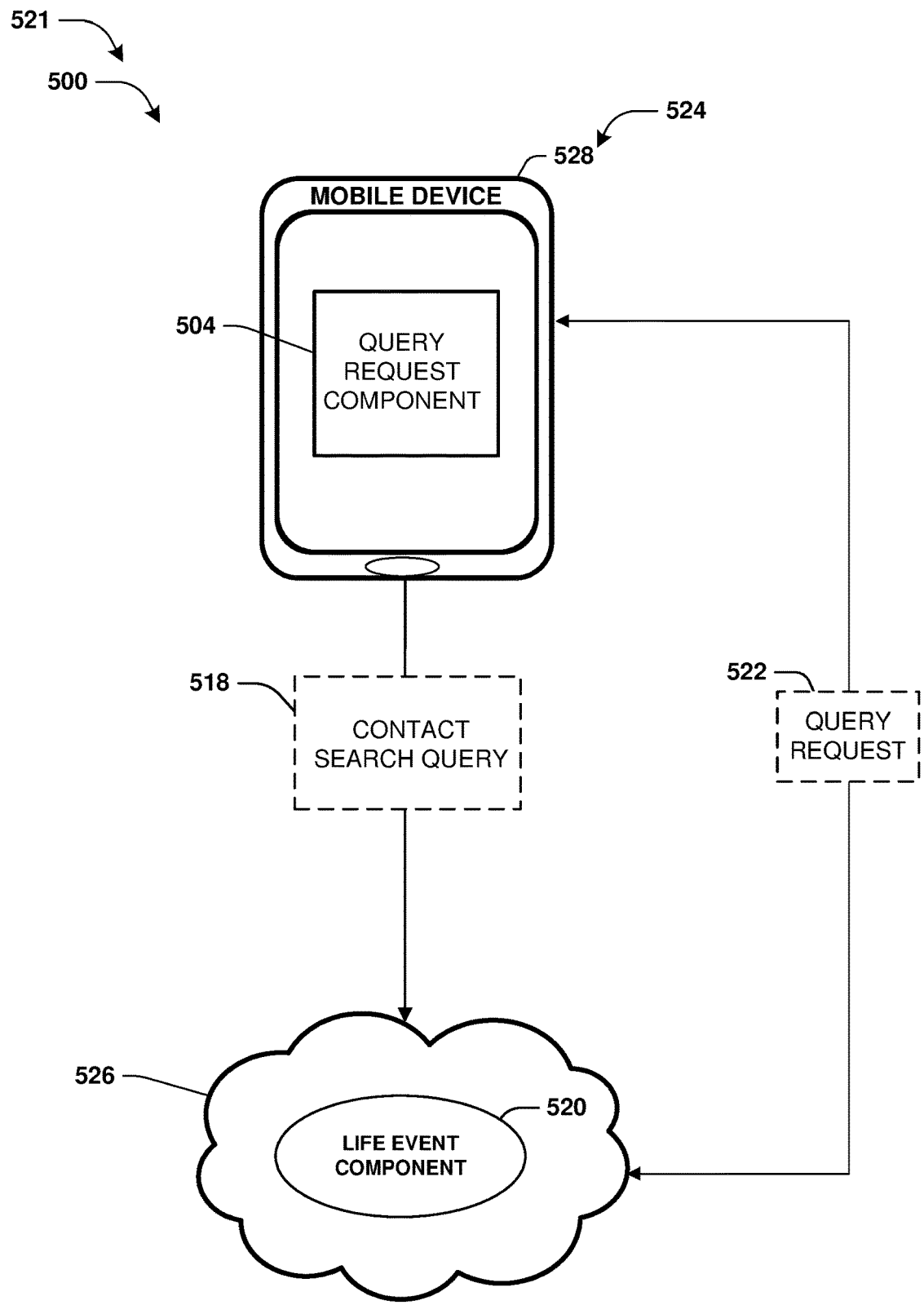
FIG. 5B is a component block diagram illustrating an example system for providing a life event notification, wherein a contact search query for a first contact is proved to a life event component.

FIG. 5B illustrates an example 521 of the system 500 wherein the query request component 504 may be configured to send the contact search query 518 to a life event component 520. In an example, the query request component 504 may be hosted on a first platform 524 of a mobile device 528 and the life event component 520 may be hosted by a second platform 526, such a cloud server. The query request component 504 may provide the contact search query 518 to a life event component 520 in response to a query request 522 being sent to and/or from the query request component 504 or the life event component 520 (e.g., a packet sent between the query request component 504 and the life event component 520 on a schedule or in response to a user action).

Figure 5C:
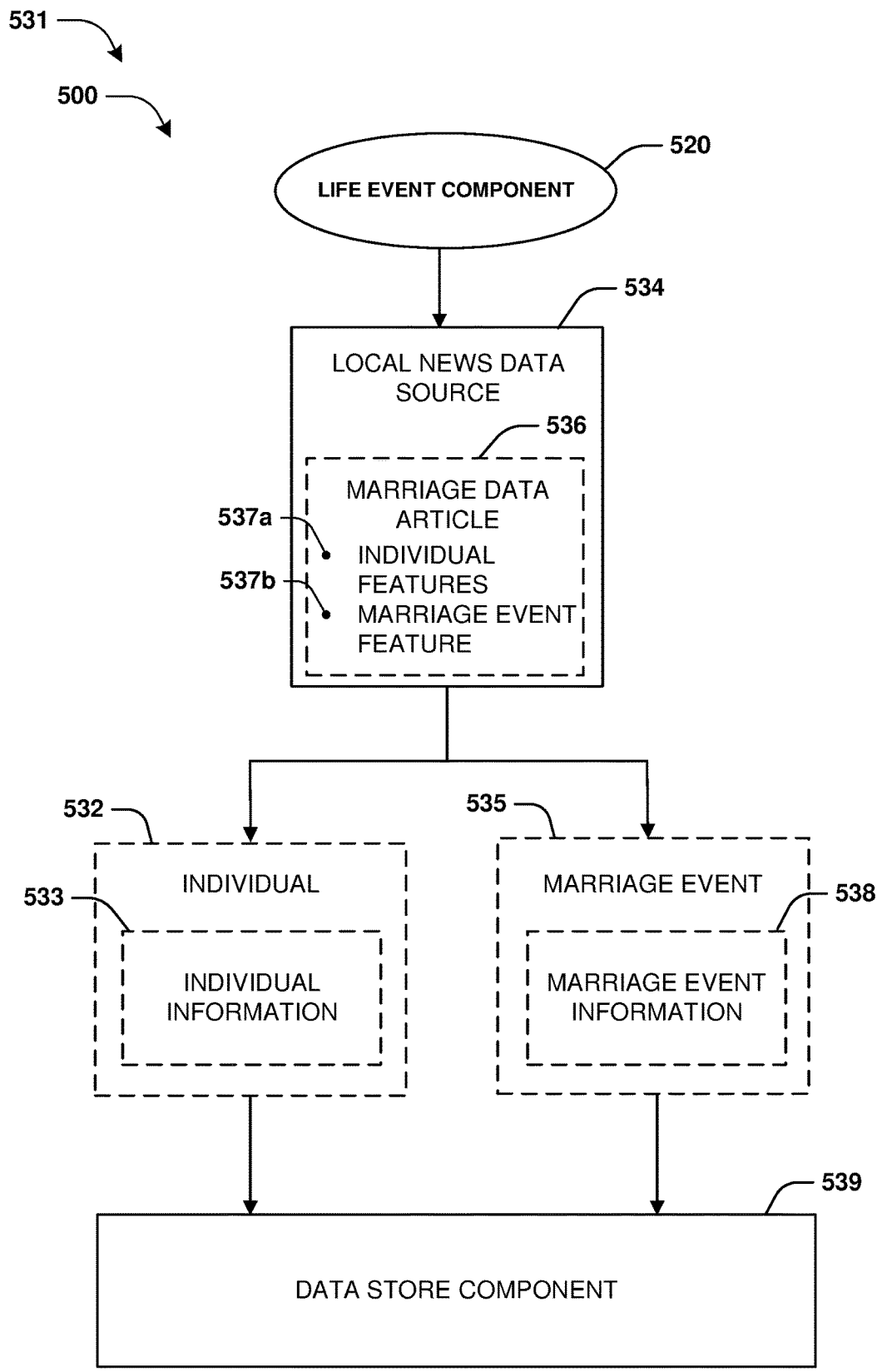
FIG. 5C is a component block diagram illustrating an example system for providing a life event notification, wherein a life event component evaluates a local news data source to identify an individual and a marriage event.

FIG. 5C illustrates an example 531 of the system 500 wherein the life event component 520 is configured to identify an individual 532 and a marriage life event 535 associated with a marriage data article 536. The life event component 520 may be configured to access a local news data source 534 comprising the marriage data article 536. For example, the life event component 520 may be configured to utilize a web crawler or search engine to access the local news data source 534. Responsive to the marriage data article 536 being identified, the life event component 520 may evaluate the marriage data article 536 to identify individual features 537a and/or event features 537b within the marriage data article 536. The life event component 520 may evaluate the individual features 527a to identify the individual 539. The individual features 537a may be evaluated to identify individual information 533 for the individual 532. The life event component 520 may evaluate the marriage event features 527b to identify the marriage event 535. The marriage event features 537b may be evaluated to identify marriage event information 538 for the marriage event 535. Responsive to the life event component 520 identifying the individual 532 and the marriage event 535, the life event component 520 may populate a data store component 539 with the individual information 533 for the individual 532 and the marriage event information 538 for the marriage event 535. The marriage event 535 may be linked to the individual 532 within the data store component 539.

Figure 5D:
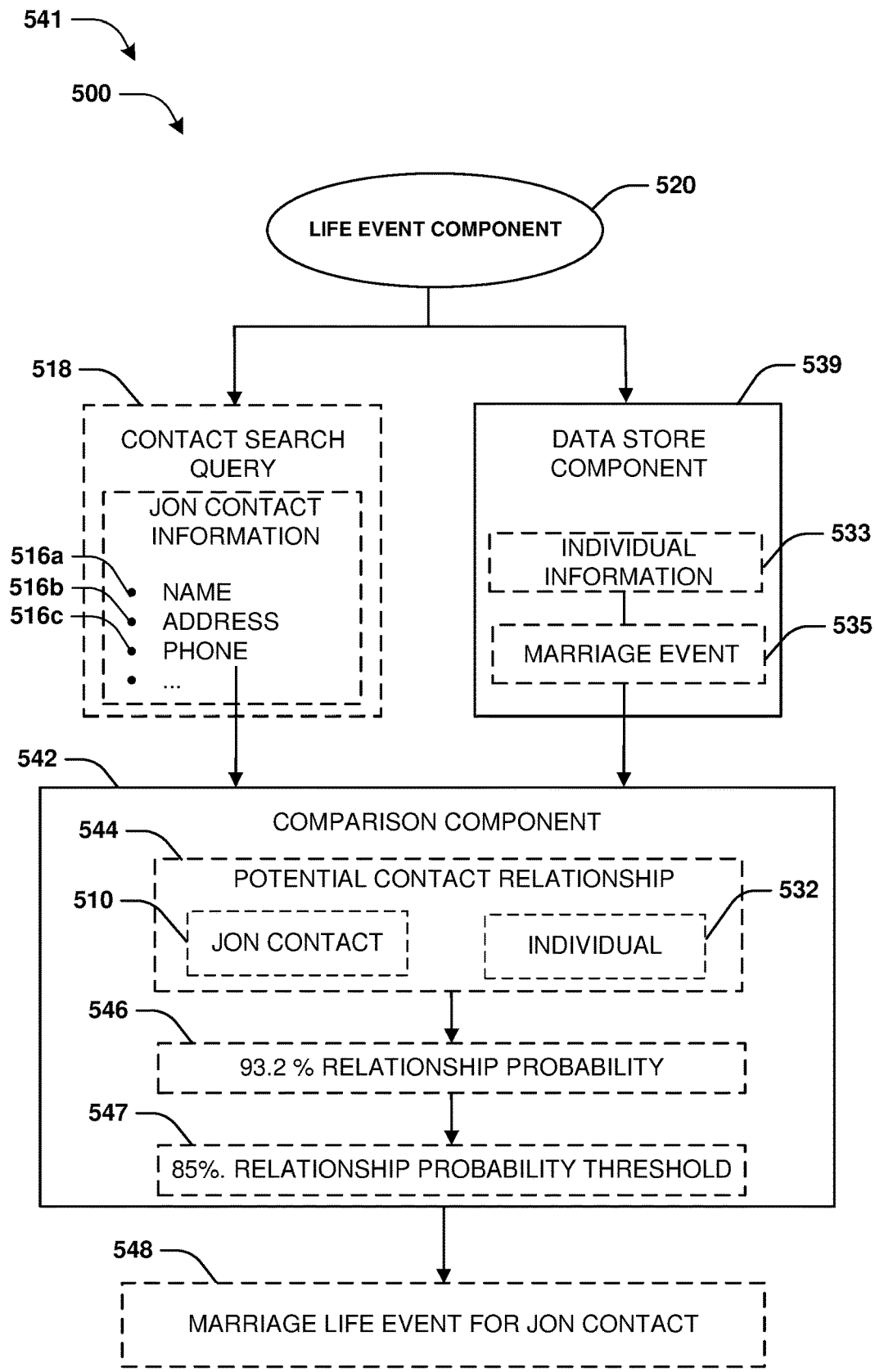
FIG. 5D is a component block diagram illustrating an example system for providing a life event notification, wherein a marriage event is determined to be associated with a first contact.

FIG. 5D illustrates an example 541 of the system 500 wherein the life event component 520 is configured to identify a marriage life event 548 for the first contact 510. In an example, the contact search query 518 and the individual information 533 for the individual 532 linked to the marriage event 535 from the data store component 539 may be provided to a comparison component 542. The comparison component 542 may evaluate the contact information 516-516c and the individual information 533 to identify a potential contact relationship 544 for the first contact 510 and the individual 532. Responsive to identifying the potential contact relationship 544, the comparison component 542 may determine a relationship probability 546 for the potential contact relationship 544. Responsive to the relationship probability 546 for the potential contact relationship 544 exceeding a relationship probability threshold 547, the comparison component 542 may determine that the first contact 510 corresponds to the individual 532. Responsive to determining the first contact 510 corresponds to the individual 532, the marriage event 535 linked to the individual 535 may be identified as a marriage life event 548 for the first contact 510.

Figure 5E:
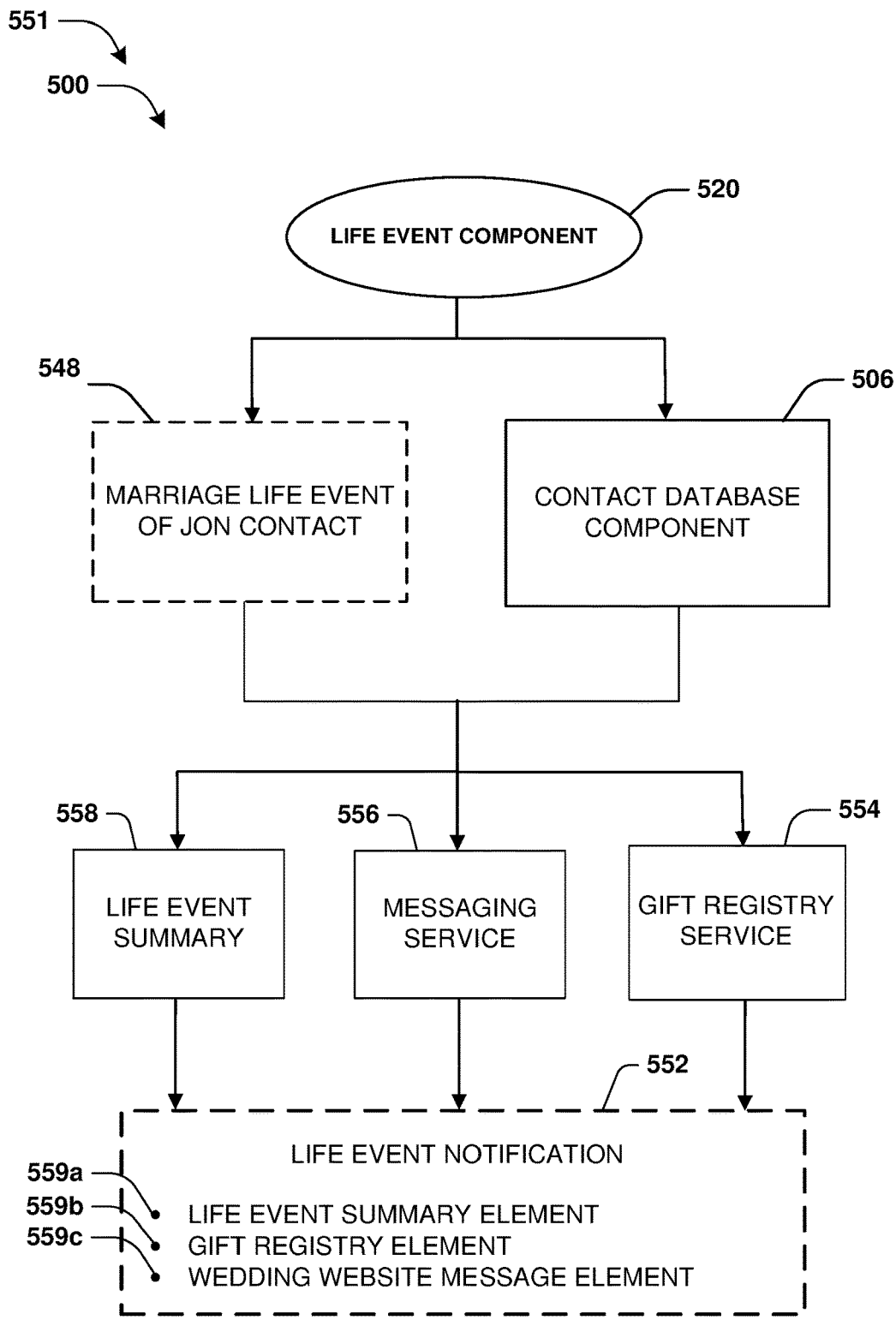
FIG. 5E is a component block diagram illustrating an example system for providing a life event notification, wherein a life event notification is generated by a life event component.

FIG. 5E illustrates an example 551 of the system 500 wherein the life event component 520 is configured to generate a life event notification 552. In an example, the life event component 520 may evaluate the marriage life event 548 to create a life event summary 558 (e.g., a summary of the key points from the text of marriage event article) from the marriage event information (not illustrated). The life event component 520 may evaluate the marriage life event 548 and/or the contact database component 506 to identify related services associated with the marriage life event 548, such as a gift registry service 554. The contact database component 506 may be utilized to identify the related services and/or provide autofill suggestion for the related services (e.g., the contact database component 506 may comprise contact information for the first contact, such as the first contacts favorite restaurant or the location of the first contacts home, etc., which may be utilized to select the related service opportunity). The life event component 520 may evaluate the marriage life event 548 and/or the contact database component 506 to identify a messaging service 556 associated with the marriage life event 548. The messaging service 556 may comprise a webpage message board associated with a wedding website, a text message service, or the like. The life event component 520 may utilize the life event summary 558, the messaging service 556, and/or the gift registry service 554 to generate the life event notification 552. In an example, the life event notification 552 may comprise user interface elements, such as user interface elements 559a-559c.

Figure 5F:
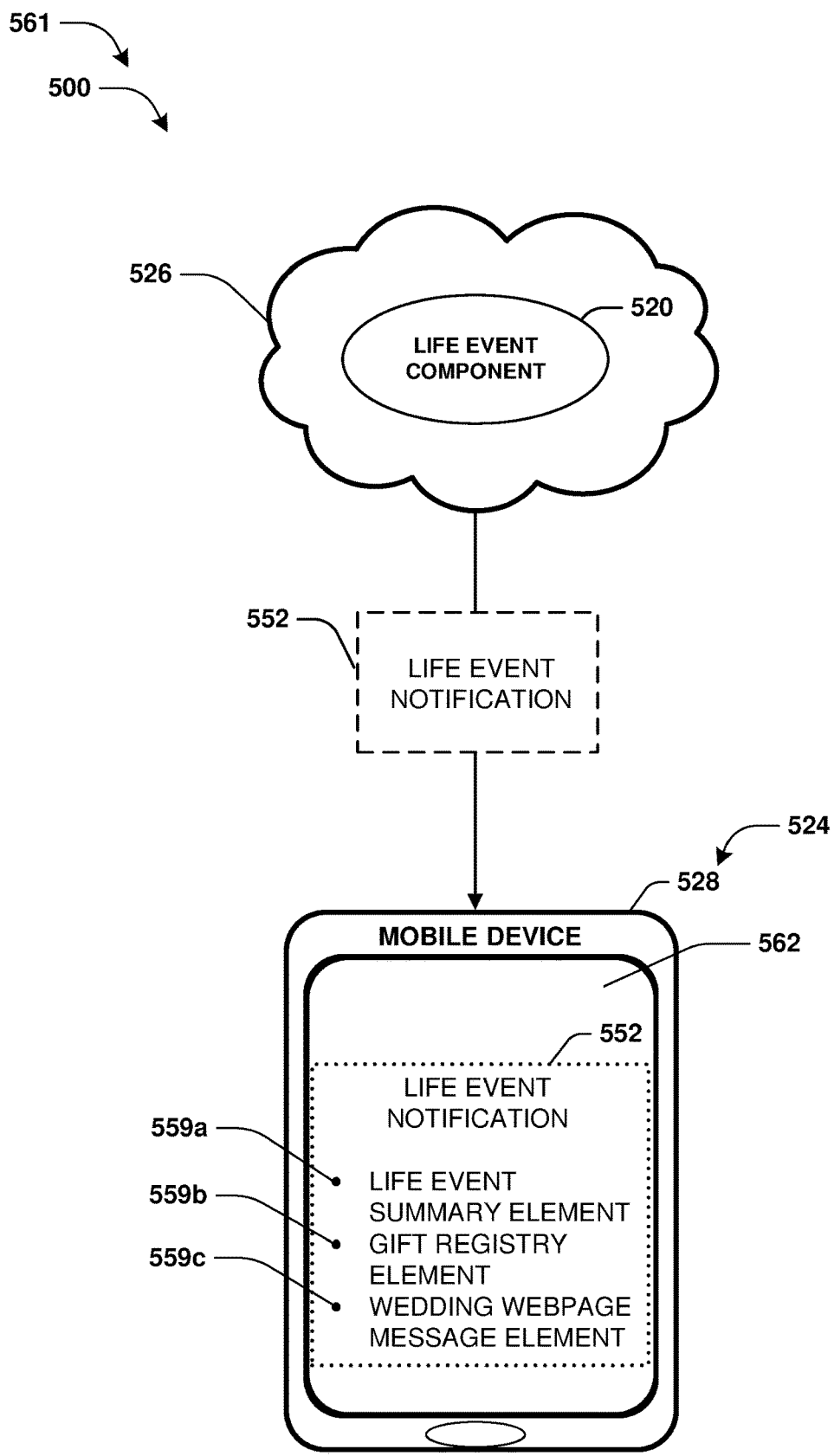
FIG. 5F is a component block diagram illustrating an example system for providing a life event notification, wherein a life event notification is provided to a mobile device.

FIG. 5F illustrates an example 561 of the system 500 wherein the life event component 520 is configured to provide the life event notification 552 to the mobile device 528. In an example, the second platform 529 may be utilized to send the life event notification 552 to the mobile device 528. Responsive to receiving the life event notification 552, the first platform 524 may be configured to display the life event notification 552 on a display 562 of the mobile device 528.

Figure 6A:
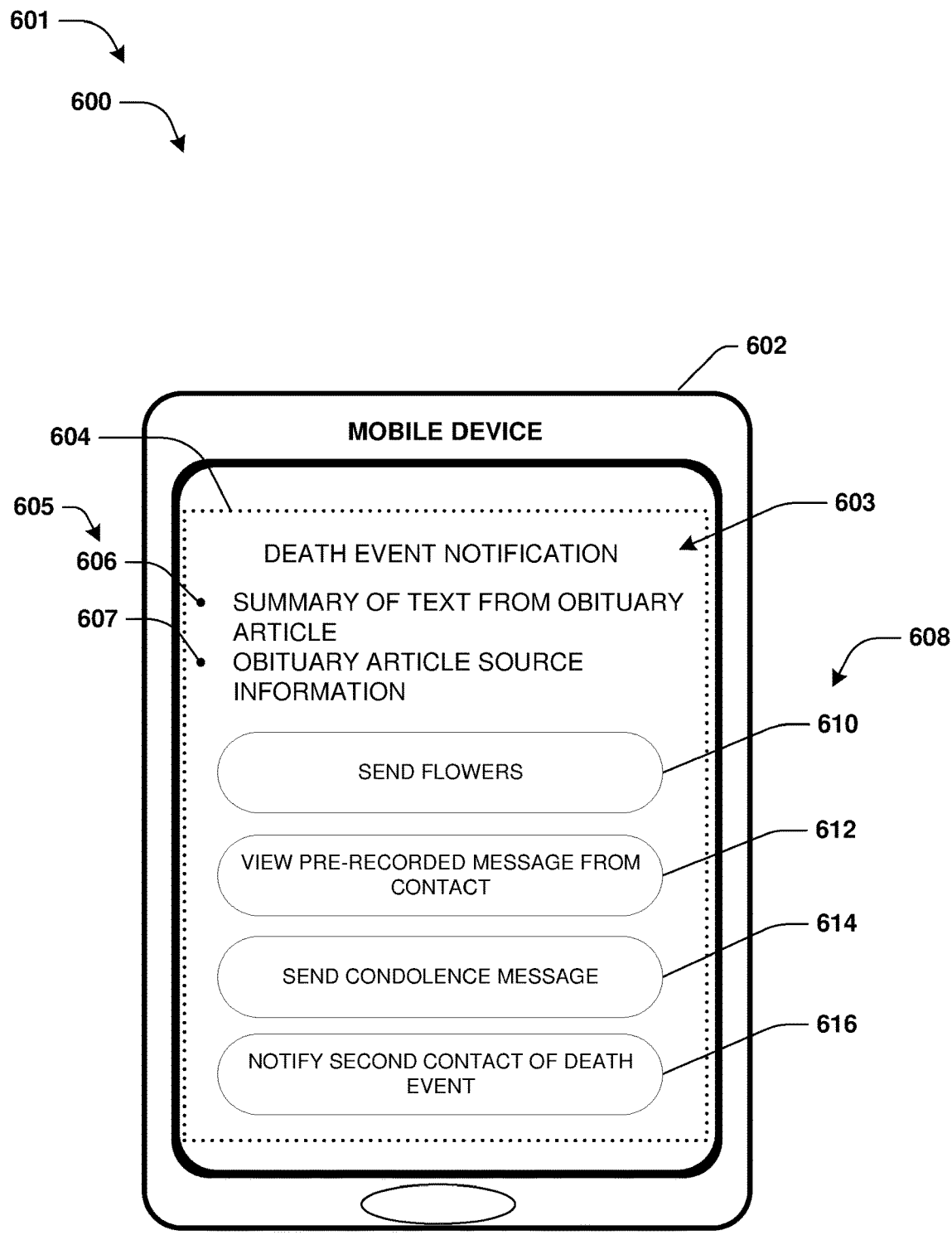
FIG. 6A is a component block diagram illustrating an example system for providing a life event notification, where the life event notification is for a death event.

FIGS. 6A-5F illustrate examples of a system 600 wherein a notification 604 of a death event is displayed a mobile device 602. FIG. 6A illustrates an example 601 of the system 600 wherein a first user interface 603 of the death event notification 604 comprises a summary element 605. The summary element 605 may comprise a textual summary 606 of a data article utilized to identify the death event and/or source information 607 associated with the data article (e.g., a link to the data article, such as an obituary webpage or a funeral home website, etc.). In an example, the notification 604 may comprise a set of service elements 608. The set of service elements 608 may comprise a send flowers element 610, a pre-recorded message element 612, a send condolence message element 614, and/or an associated contact notification element 616.

Figure 6B:
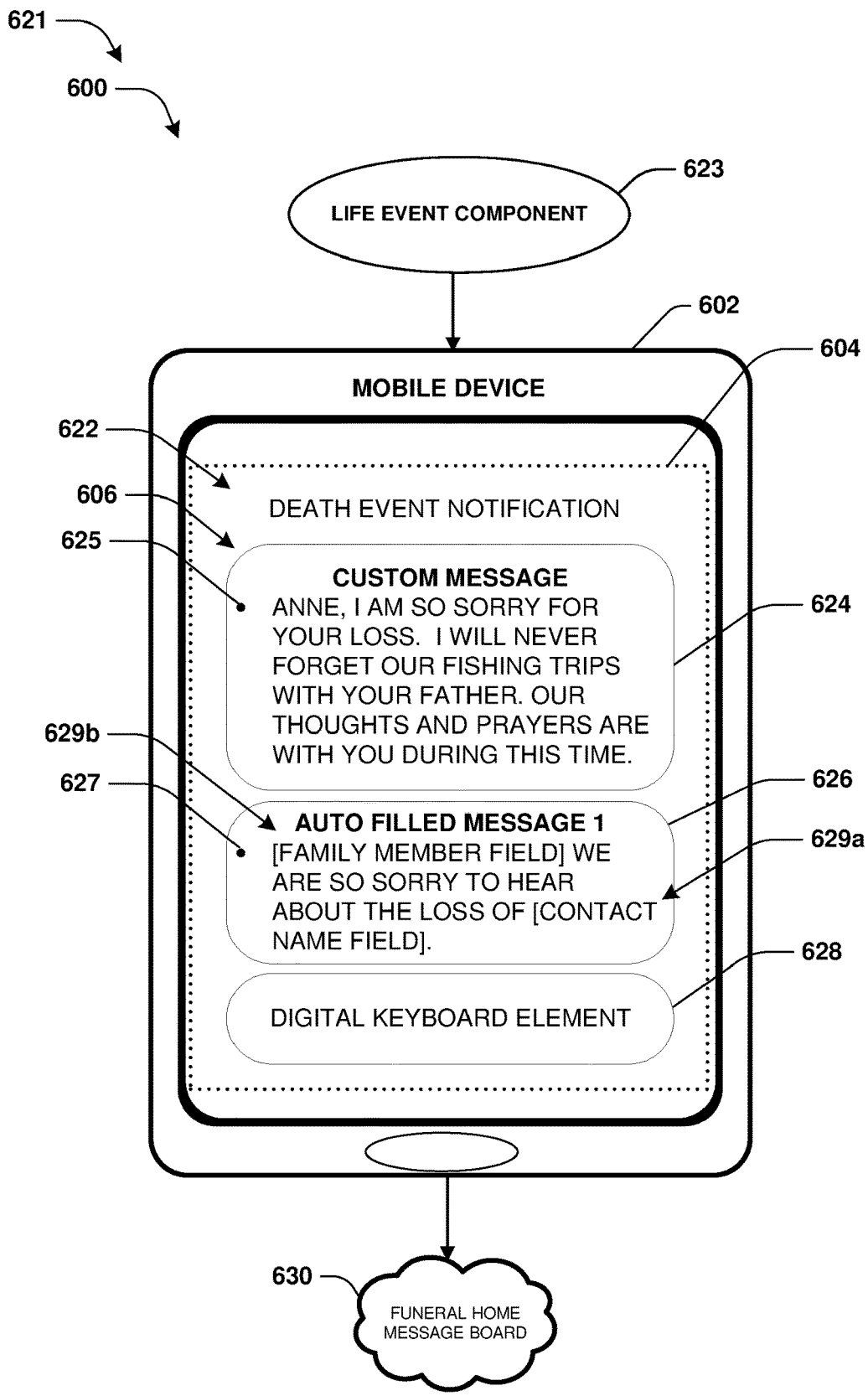
FIG. 6B is a component block diagram illustrating an example system for providing a life event notification, wherein a message is provided.

FIG. 6B illustrates an example 621 of the system 600 wherein a second user interface 622 of the notification 604 is displayed in response to a user (not illustrated) selecting the condolence message element 614 (illustrated in FIG. 6A). In an example, the second user interface 622 may comprise a set of message options 606. The set of message options 606 may comprise a custom message option 624 and/or an auto filled message option 626. The custom message option 624 may comprise a custom text 625 entered by the user, such as by utilizing an electronic keyboard element 628 displayed on the second user interface 622. The auto filled message option 626 may comprise a template text form 627 having personalization fields 629a-629b. In an example, a life event component 623 may provide contact information from a contact database (not illustrated) for input into the personalization fields 629a-629b (e.g., the name of the contact associated with the death event may be populated into a contact name filed of a template message and/or the names of the contact's family may be populated into a family field within the template message, etc.). Responsive to the user selecting the custom message option 624 and/or the auto filled message option 626, the corresponding message may be sent to a funeral home message board 630 associated with a funeral for the contact.

Figure 6C:
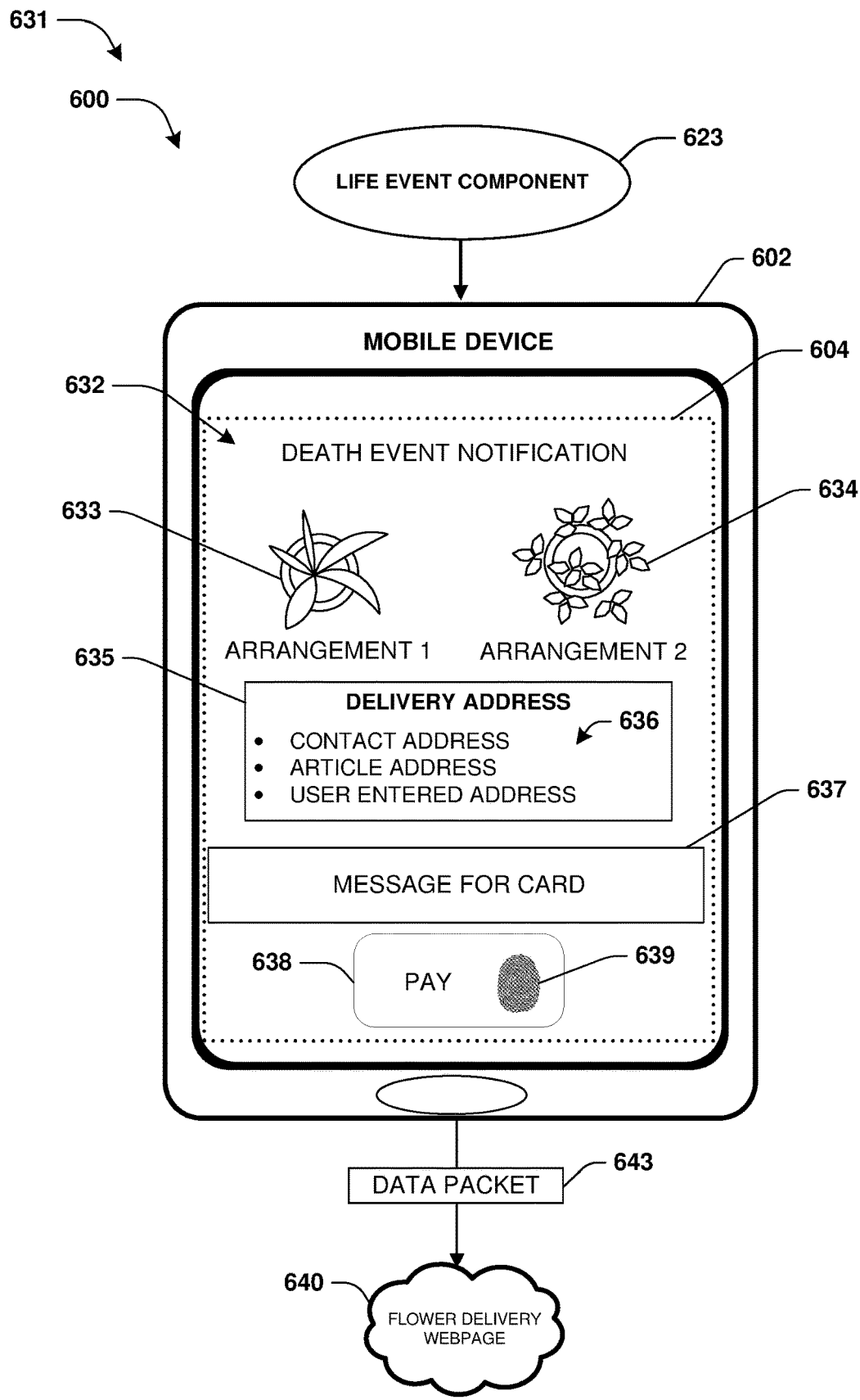
FIG. 6C is a component block diagram illustrating an example system for providing a life event notification, wherein a first flower arrangement is ordered.

FIG. 6C illustrates and example 631 of the system 600 wherein a third user interface 632 of the notification 604 is displayed in response to a user (not illustrated) selecting the send followers element 610 (illustrated in FIG. 6A). The third user interface 632 may comprise a first flower arrangement option 633, a second follower arrangement option 634, a delivery information field 635, a card message field 637, and/or a payment information field 638. In an example, responsive to selecting the first flower arrangement option 633, the life event component may automatically populate the delivery information filed 635 with delivery address options 636 associated with the contact (e.g., the home address of the contact, the address of the funeral, the address of a family member of the contact, etc.). The card message field 637 may be utilized to provide a personal message to be sent along with the first flower arrangement 633 (e.g., the user may type the personal message on a digital keyboard (not illustrated) that may be displayed in response to the user selecting the card message field 637 on the third user interface 632). The payment information field 638 may be utilized to pay for the first arrangement 633. In an example, the payment information field 638 may utilize an encrypted biometric payment feature, such as a fingerprint verification feature 639. In an example, the fingerprint verification feature 639 may utilize a fingerprint scanner (not illustrated) associated with the mobile device 602. Responsive to the user providing inputs for at least one of the first flower arrangement option 633, the delivery information field 635, the card message field 637, and/or the payment information field 638, a data packet 643 associated with the inputs may be provided to a follower delivery webpage 640 to initiate a floral order.

Figure 6D:
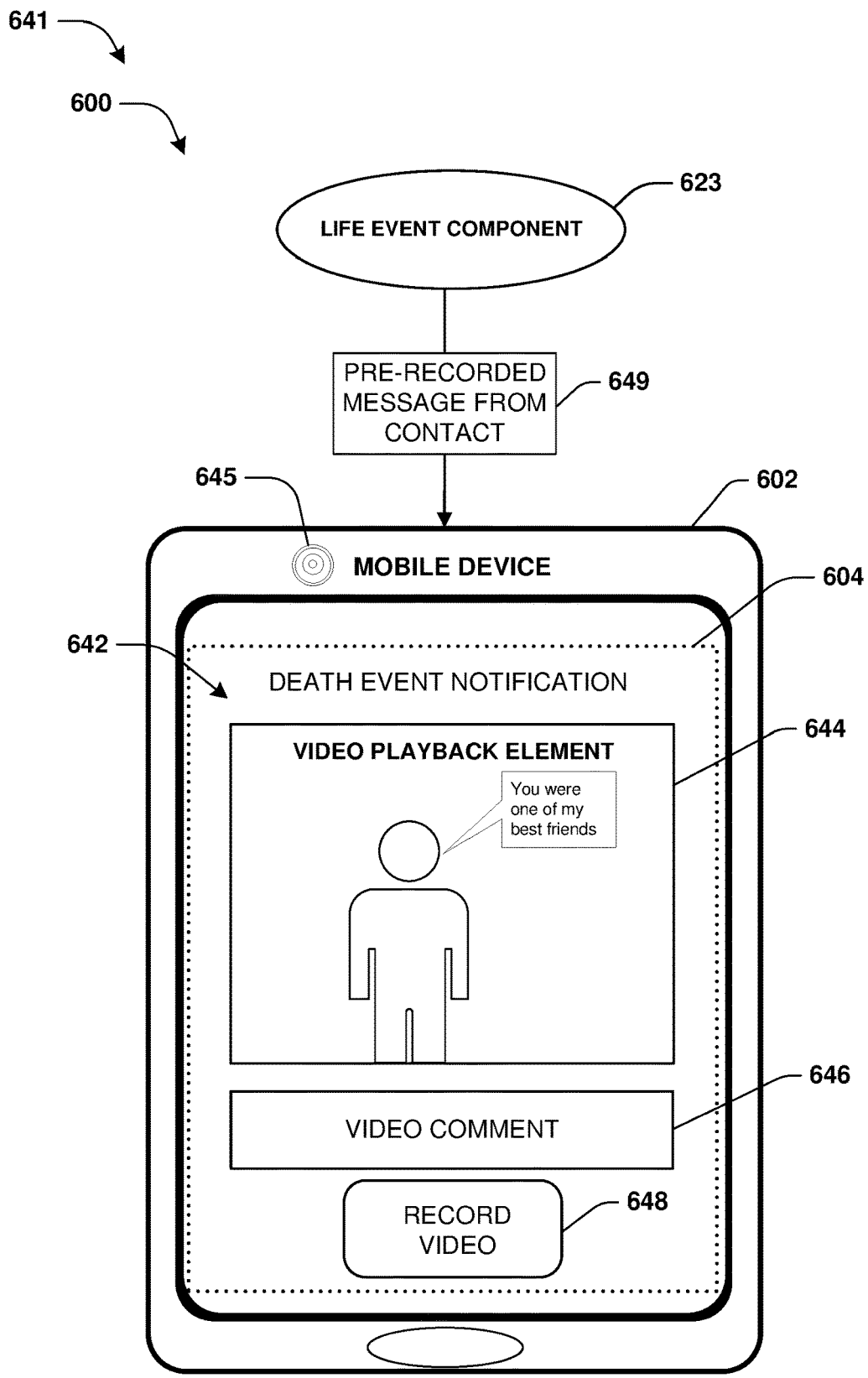
FIG. 6D is a component block diagram illustrating an example system for providing a life event notification, wherein a pre-recorded message is displayed.

FIG. 6D illustrates and example 641 of the system 600 wherein a fourth user interface 642 of the notification 604 is displayed in response to a user (not illustrated) selecting the pre-recorded message element 612 (illustrated in FIG. 6A). In an example, the fourth user interface 642 may comprise a video playback element 644, a video comment element 646, and a video capture element 648. The video playback element may be utilized to display a pre-recorded message 649. In an example, the life event component 623 may be configured to access a recorded message database (not illustrated) to identify the pre-recorded message 649 and send the pre-recorded message 649 to the mobile device 602 to be displayed by the video playback element 644. The video comment element 646 may be utilized to allow the user to comment on and/or share the pre-recorded message 649. The video capture element may be utilized to create a reply video message of the user. In an example, a camera 645 of the mobile device 602 may be utilized to create the replay video message.

Figure 6E:
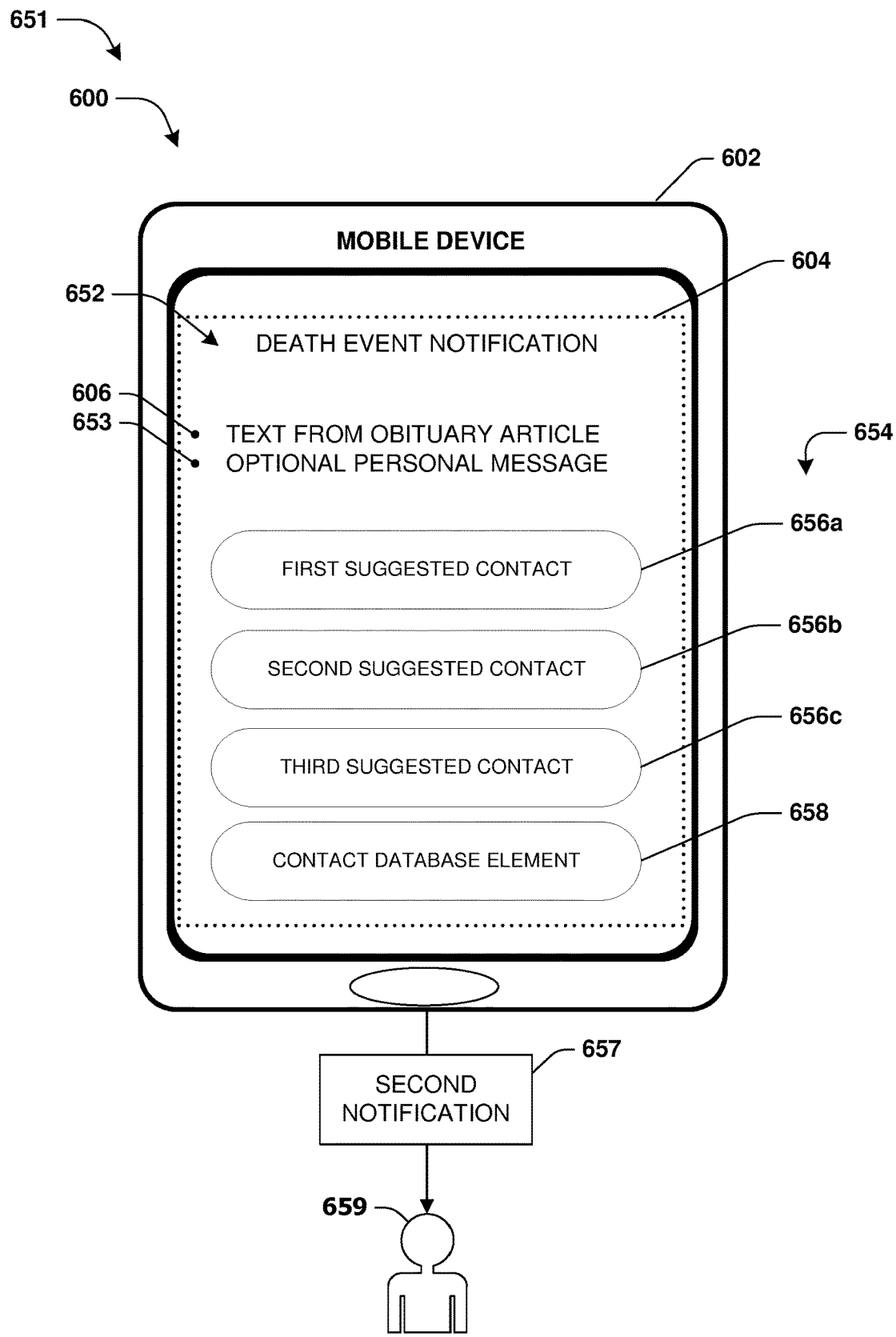
FIG. 6E is a component block diagram illustrating an example system for providing a life event notification, wherein a second notification is provided to a second contact.

FIG. 6E illustrates and example 651 of the system 600 wherein a fifth user interface 652 of the notification 604 is displayed in response to a user (not illustrated) selecting the associated contact notification element 616 (illustrated in FIG. 6A). In an example, the fifth user interface 652 may comprise the textual summary element 606, a personal message element 653, a set of suggested contact elements 654, and a contact database element 658. The personal message element 653 may be utilized by the user to send a personal message to a second contact 559. The set of suggested contact elements 654 may comprise a first suggested contact element 656a, a second suggested contact element 656b, and/or a third suggested contact element 656c. The set of suggested contacts 654 may comprise contact information for other contacts from a contact database that are associated with the contact of the death event, such as the second contact 659. In this way, the system 600 may efficiently assist a user by identifying associated contacts that the user may desire to notify about the death event for the contact. In an example, the contact database element 658 may be utilized by the user to assess a list of contacts which the user can manually identify as being related to the contact. Responsive to the user selecting the first suggested contact element 656a corresponds to the second user 659, a second notification may be sent to the second user 659.

Figure 6F:
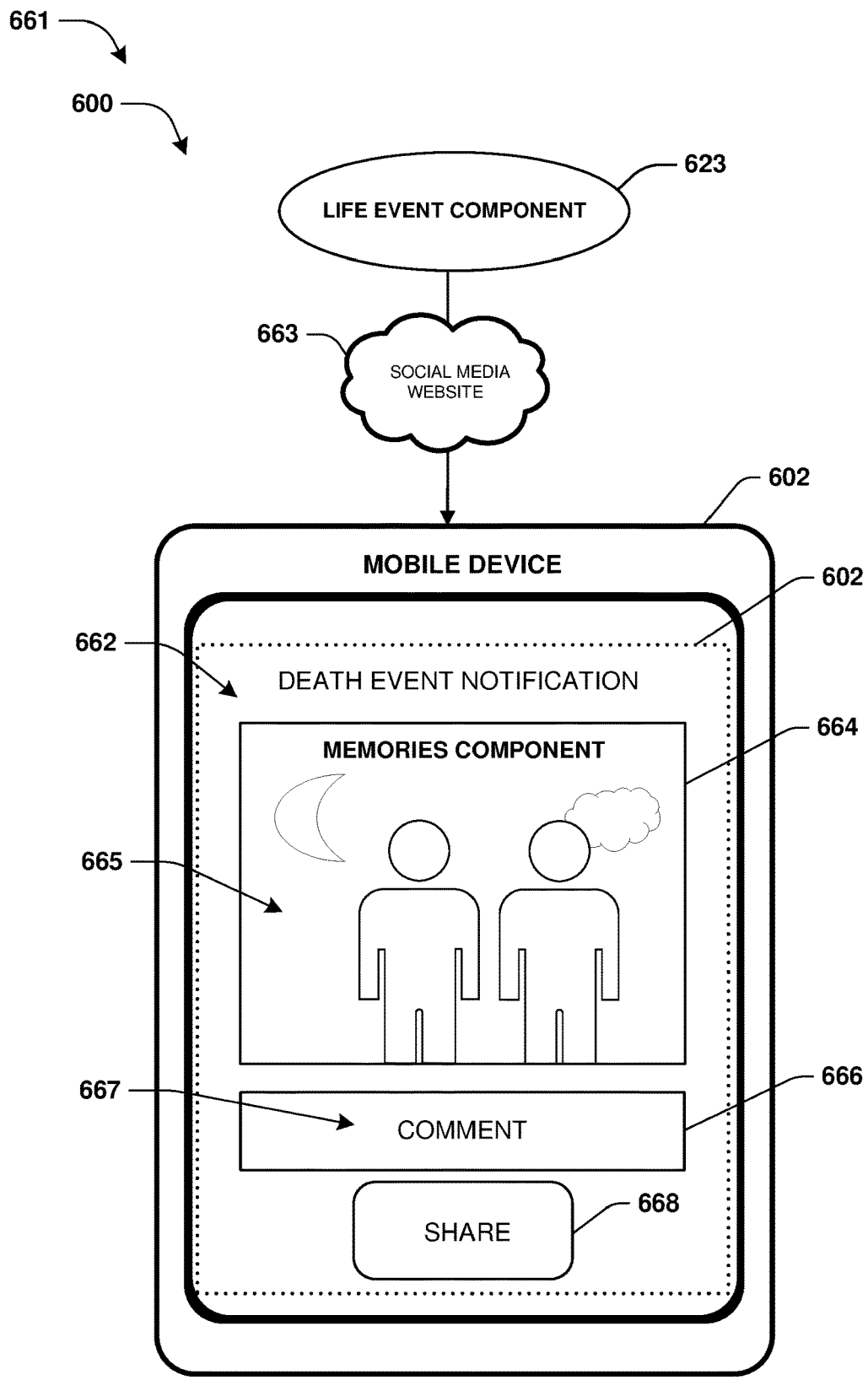
FIG. 6F is a component block diagram illustrating an example system for providing a life event notification, wherein an image is provided to a user.

FIG. 6F illustrates and example 661 of the system 600 wherein a sixth user interface 662 of the notification 604 is displayed in response to a user (not illustrated) selecting a memories element (not illustrated). In an example, the life event component 623 may assess a social media website 663 to identifying an image 665 associated with the user and/or the contact. The image 665 may be displayed by a memories comment 664 associated with the sixth user interface 662. In an example, the sixth user interface 662 may comprise a commenting option 666 and/or a sharing option 669. The commenting option 666 may be utilized by the user to create a comment 667 for the image 665. The sharing option 668 may be utilized by the user to share the image 665 and/or a comment 667 with others, such as through the social media website 663 or the like (e.g., email, text message, etc.).

Figure 7:
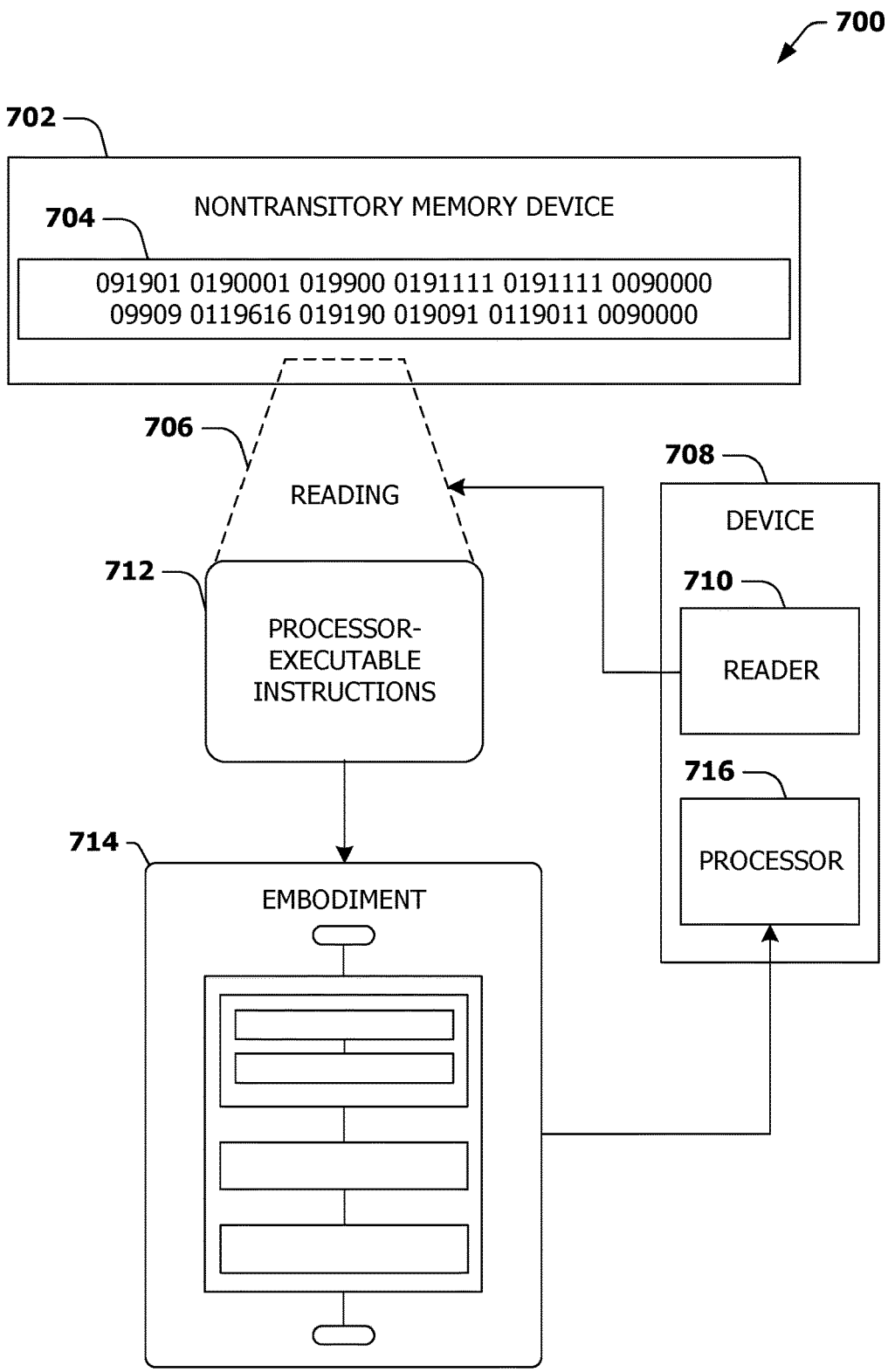
FIG. 7 is an illustration of a scenario featuring an example nontransitory memory device in accordance with one or more of the provisions set forth herein.

FIG. 7 is an illustration of a scenario 700 involving an example nontransitory memory device 702. The nontransitory memory device 702 may comprise instructions that when executed perform at least some of the provisions herein. The nontransitory memory device may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD, DVD, or floppy disk). The example nontransitory memory device 702 stores computer-readable data 704 that, when subjected to reading 706 by a reader 710 of a device 708 (e.g., a read head of a hard disk drive, or a read operation invoked on a solid-state storage device), express processor-executable instructions 712. In some embodiments, the processor-executable instructions, when executed on a processor 716 of the device 708, are configured to perform a method, such as at least some of the example method 400 of FIG. 4, for example. In some embodiments, the processor-executable instructions, when executed on the processor 716 of the device 708, are configured to implement a system, such as at least some of the example system 500 of FIGS. 5A-5F and/or at least some of the example system 600 of FIGS. 6A-6F, for example.

3. Usage of Terms

As used in this application, "component," "module," "system," "interface," and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method of providing a notification of a life event to a user for a contact associated with the user, the method comprising:
    evaluating a contact database associated with the user to identify a contact from a set of contacts;
    creating a contact query for the contact from the set of contacts;
    utilizing the contact query to access data articles stored in a data store to identify a potential life event of the contact;
    extracting from one or more data articles associated with the potential life event a set of features;
    ranking the set of features to generate a set of ranked features;
    computing a contact relationship probability based upon the set of ranked features, wherein:
        a first weight is applied to a first ranked feature of the set of ranked features in computing the contact relationship probability and a second weight is applied to a second ranked feature of the set of ranked features in computing the contact relationship probability,
        the first ranked feature is ranked higher than the second ranked feature in the set of ranked features, and
        the first weight is greater than the second weight;
    responsive to determining that the potential life event is a life event of the contact based upon the contact relationship probability exceeding a specified threshold:
        providing a first notification of the life event to the user, wherein the first notification comprises a related contact notification element;
    responsive to the user selecting the related contact notification element, providing a list comprising a set of one or more other contacts; and
    responsive to the user selecting a second contact from the list, providing a second notification of the life event to the second contact.

2. The method of claim 1, comprising:
    evaluating a calendar associated with the user to identify a block of time within the calendar having a specified characteristic, wherein the utilizing the contact query to access the data articles stored in the data store to identify the potential life event of the contact comprises, upon determining that a current time is within the block of time having the specified characteristic, utilizing the contact query to access the data articles stored in the data store to identify the life event of the contact.

3. The method of claim 1, comprising:
    determining a location of the user, wherein the utilizing the contact query to access the data articles stored in the data store to identify the potential life event of the contact comprises, upon determining that the location of the user corresponds to a specified location, utilizing the contact query to access the data articles stored in the data store to identify the life event of the contact.

4. The method of claim 1, wherein:
    the data articles are associated with a data source, and
    the data source comprises at least one of a website, an intranet, a local network database, or a declarative source.

5. The method of claim 1, wherein the contact database comprises at least one of an electronic address book, a social network contact list, an email contact list, an application profile, a message board contact list, or a user created contact list.

6. The method of claim 1, wherein the contact database is stored locally on a mobile device of the user.

7. The method of claim 1, wherein the contact database is stored on a cloud based server.

8. The method of claim 1, wherein the first notification is at least one of a push notification, an email notification, a text notification, a video notification, a virtual reality notification, or an augmented reality notification.

9. The method of claim 1, comprising:
    responsive to determining that the potential life event is the life event of the contact, assessing a pre-recorded message database to identify a pre-recorded message associated with the contact, wherein the providing the first notification of the life event comprises:
        providing the pre-recorded message associated with the contact to the user as a pre-recorded message element within the first notification.

10. The method of claim 1, comprising:
    generating the first notification of the life event, wherein the generating the first notification comprises:
        creating a life event summary from content of a first data article of the data articles; and
        identifying a service associated with the life event, wherein the providing the first notification of the life event comprises:
            displaying a life event summary element associated with the life event summary and a service element associated with the service on a mobile device of the user.

11. The method of claim 1, wherein:
    the first notification comprises a service element for a service associated with the life event, and
    the service comprises at least one of:
        a flower service, a donation service, a food service, an electronic calling hours service, an electronic guest book service, a wedding registry service, a card service, a transportation service, a babysitting service, or a gift services.

12. The method of claim 1, comprising:
evaluating a data source to identify a first data article and a second data article;
evaluating the first data article and the second data article to identify life events and individuals within the first data article and the second data article; and
responsive to identifying an individual and a life event for the first data article but not the second data article, populating the first data article but not the second data article into the data store.

13. The method of claim 12, wherein data articles are populated into the data store in real-time or near real-time.

14. The method of claim 1, comprising:
identifying a first contact database and a second contact database associated with the user; and
combining the first contact database and the second contact to create the contact database.

15. The method of claim 1, wherein:
the evaluating the contact database associated with the user to identify the contact from the set of contacts comprises evaluating the contact database to identify a plurality of contacts,
the creating the contact query for the contact from the set of contacts comprises creating a plurality of contact queries for the plurality of contacts,
the method comprises ranking the plurality of contacts according to a degree of activity between each of the plurality of contacts and the user, and
the utilizing the contact query to access the data articles stored in the data store to identify the potential life event of the contact comprises, for a subset of the plurality of contacts having a rank above a specified threshold, utilizing contact queries to access the data articles stored in the data store to identify one or more potential life events of one or more of the subset of the plurality of contacts.

16. A non-transitory computer readable medium comprising computer executable instructions that when executed by a processor perform a method of providing a notification of a life event to a user for a contact associated with the user, the method comprising:
evaluating a contact database associated with the user to identify a contact from a set of contacts;
creating a contact query for the contact from the set of contacts;
utilizing the contact query to access data articles stored in a data store to identify a potential life event of the contact;
extracting from one or more data articles associated with the potential life event a set of features;
ranking the set of features to generate a set of ranked features;
computing a contact relationship probability based upon the set of ranked features, wherein:
a first weight is applied to a first ranked feature of the set of ranked features in computing the contact relationship probability and a second weight is applied to a second ranked feature of the set of ranked features in computing the contact relationship probability,
the first ranked feature is ranked higher than the second ranked feature in the set of ranked features, and
the first weight is greater than the second weight;
responsive to determining that the potential life event is a life event of the contact based upon the contact relationship probability exceeding a specified threshold:
providing a first notification of the life event to the user, wherein the first notification comprises a related contact notification element;
responsive to the user selecting the related contact notification element, providing a list comprising a set of one or more other contacts; and
responsive to the user selecting a second contact from the list, providing a second notification of the life event to the second contact.

17. The non-transitory computer readable medium of claim 16, wherein the method comprises:
evaluating a calendar associated with the user to identify a block of time within the calendar having a specified characteristic, wherein the utilizing the contact query to access the data articles stored in the data store to identify the potential life event of the contact comprises, upon determining that a current time is within the block of time having the specified characteristic, utilizing the contact query to access the data articles stored in the data store to identify the life event of the contact.

18. The non-transitory computer readable medium of claim 16, wherein the method comprises:
determining a location of the user, wherein the utilizing the contact query to access the data articles stored in the data store to identify the potential life event of the contact comprises, upon determining that the location of the user corresponds to a specified location, utilizing the contact query to access the data articles stored in the data store to identify the life event of the contact.

19. The non-transitory computer readable medium of claim 16, wherein the method comprises:
generating the first notification of the life event, wherein the generating the first notification comprises:
creating a life event summary from content of a first data article of the data articles; and
identifying a service associated with the life event, wherein the providing the first notification of the life event comprises:
displaying a life event summary element associated with the life event summary and a service element associated with the service on a mobile device of the user.

20. The non-transitory computer readable medium of claim 16, wherein:
the evaluating the contact database associated with the user to identify the contact from the set of contacts comprises evaluating the contact database to identify a plurality of contacts,
the creating the contact query for the contact from the set of contacts comprises creating a plurality of contact queries for the plurality of contacts,
the method comprises ranking the plurality of contacts according to a degree of activity between each of the plurality of contacts and the user, and
the utilizing the contact query to access the data articles stored in the data store to identify the potential life event of the contact comprises, for a subset of the plurality of contacts having a rank above a specified threshold, utilizing contact queries to access the data articles stored in the data store to identify one or more potential life events of one or more of the subset of the plurality of contacts.

* * * * *